United States Patent
Song

(10) Patent No.: US 8,009,747 B2
(45) Date of Patent: Aug. 30, 2011

(54) METHOD FOR SUPPRESSING THE INTER-CARRIER INTERFERENCE IN THE ORTHOGONAL FREQUENCY DIVISION MULTIPLEXING MOBILE COMMUNICATION SYSTEM

(75) Inventor: Rongfang Song, Shenzhen (CN)

(73) Assignee: ZTE Corporation (CN)

( * ) Notice: Subject to any disclaimer, the term of this patent is extended or adjusted under 35 U.S.C. 154(b) by 459 days.

(21) Appl. No.: 11/722,907

(22) PCT Filed: Dec. 28, 2004

(86) PCT No.: PCT/CN2004/001540
§ 371 (c)(1),
(2), (4) Date: Mar. 31, 2008

(87) PCT Pub. No.: WO2006/069475
PCT Pub. Date: Jul. 6, 2006

(65) Prior Publication Data
US 2008/0304585 A1     Dec. 11, 2008

(51) Int. Cl.
*H04K 1/10*     (2006.01)

(52) U.S. Cl. ........ 375/260; 375/296; 375/299; 375/346; 375/347; 375/348; 375/349

(58) Field of Classification Search .................. 375/260, 375/296, 299, 346, 347, 348, 349
See application file for complete search history.

(56) References Cited

U.S. PATENT DOCUMENTS

| | | | |
|---|---|---|---|
| 5,357,502 A | 10/1994 | Castelain et al. | |
| 6,650,617 B1* | 11/2003 | Belotserkovsky et al. | ... 370/210 |
| 7,023,938 B1* | 4/2006 | Kapoor et al. | ............ 375/350 |
| 7,072,411 B1* | 7/2006 | Dollard | ............ 375/260 |
| 2003/0147655 A1* | 8/2003 | Shattil | ............ 398/182 |
| 2004/0005010 A1 | 1/2004 | He et al. | |
| 2004/0151254 A1 | 8/2004 | Yang et al. | |
| 2004/0252776 A1* | 12/2004 | Balakrishnan et al. | ....... 375/260 |

FOREIGN PATENT DOCUMENTS

| | | |
|---|---|---|
| EP | 1435713 | 7/2004 |
| WO | 04002038 | 12/2003 |
| WO | 2004006525 | 1/2004 |

\* cited by examiner

*Primary Examiner* — Kabir A Timory
(74) *Attorney, Agent, or Firm* — Brooks Kushman P.C.

(57) ABSTRACT

The present invention relates to a method for suppressing inter-carrier interference in an orthogonal frequency division multiplexing mobile communication system, comprising: performing down conversion of the signal received in the receiver; removing the cyclic prefix of the signal so as to obtain the original signal; performing cyclic extension of the original signal over again; adding a window to the signal after cyclic extension, wherein the window function satisfies Nyquist criterion. The method according to the invention does not need time delay information of channels, and thereby is simple to realize. The selected roll-off coefficient can be up to 1 so as to suppress ICI to the utmost extent. Additionally, the invention also suggests that the generic window functions without the ICI can be used in OFDM system, which makes the system capability of suppressing ICI stronger by means of finding the best polynomial coefficients on the condition that the roll-off coefficient is 1.

5 Claims, 3 Drawing Sheets

METHOD FOR SUPPRESSING THE INTER-CARRIER INTERFERENCE IN THE ORTHOGONAL FREQUENCY DIVISION MULTIPLEXING MOBILE COMMUNICATION SYSTEM

CROSS REFERENCE TO PRIOR APPLICATION

This application is a U.S. national phase of International Application No. PCT/CN2004/001540 filed Dec. 28, 2004, the disclosure of which is incorporated herein by reference in its entirety.

TECHNICAL FIELD

The invention relates to a mobile communication system using orthogonal frequency division multiplexing (OFDM) technique, especially to a method for improving the ability of the OFDM mobile communication system to suppress inter-carrier interference (ICI).

BACKGROUND ART

OFDM technique is publicly recognized as a key technique in the new generation wireless communication system. It can effectively resist inter-symbol interference (ISI) and multi-path fading resulted from multi-path, converting a frequency-selective fading channel into several frequency-nonselective fading channels. However, the OFDM technique is highly sensitive to transceiving carrier frequency offset, which will lead to the ICI, and thus affect the performance of the whole system.

The paper "*OFDM for wireless multimedia communications*" (Norwood, M A: Artech House, 2000) authored by R. Van Nee and R. Parasad discloses a method for shaping pulse for each transmitting subcarrier at the transmitting end, which is equivalent to performing windowing for the output of Inverse Fast Fourier Transform (IFFT). However, this method can only reduce the out-of-band emission of the OFDM communication system, but not the ICI. This is because in the practical OFDM system, each OFDM symbol has cyclic prefix to resist ISI, the window function only influences the cyclic extension part of the signal, but the original part of the signal does not change; while at the receiving end, only the original part of the signal is performed Fast Fourier Transform (FFT).

The paper "*Reduced ICI in OFDM systems using the "Better than" Raised-Cosine pulse*" (IEEE Commun. Lett. Vol. 8, No. 3, pp. 135-137, March 2004) authored by P. Tan and N. C. Beaulieu discloses a method for reducing ICI by the means of windowing at the transmitting end, which, however, is only applicable to the classical OFDM symbol which has no cyclic prefix.

The paper "*Improving an OFDM reception using an adaptive Nyquitst windowing*" (IEEE Trans. Consumer Electronics, Vol. 42, No. 3, pp. 259-269, August 1996) authored by C. Muschallik discloses a technique of windowing before performing FFT at the receiving end, wherein, the function range of the window function is the original signal part and the part not interfered in the cyclic prefix; the window function must satisfy Nyquist criterion so that there will be no ICI when there is no carrier frequency offset; and the roll-off coefficient of the window function is adaptive to the change of channel, if the part not interfered in the protecting interval is large, then relatively great roll-off coefficient can be used to better reduce the ICI. The main disadvantages of the method are: (i) since the unconsumed protecting interval is generally very small, the chosen roll-off coefficient will also be very small, and thus the ability of suppressing ICI is very limited; (ii) only the raised cosine function is chosen as the window function, which is not the optimal choice.

SUMMARY OF THE INVENTION

The present invention is raised to solve the above problems in prior art. The purpose of the invention is to provide a method for suppressing ICI in an OFDM mobile communication system, which can suppress the ICI caused by carrier frequency offset to the unmost extent.

According to one aspect of the invention, a method for suppressing ICI in an OFDM mobile communication system is provided, wherein the original signal is attached with cyclic prefix over again and is added with a window at the receiving end.

Preferably, said method for suppressing ICI includes: performing down-conversion for the received signal at the receiving end; removing the cyclic prefix of the signal so as to obtain the original signal; performing cyclic extension for the original signal over again; adding a window to the signal after cyclic extension; wherein the window function in the process of adding window satisfies Nyquist criterion.

Preferably, the frequency spectrum of the window function in said step of adding window is:

$$W_r(f) = \sin c(fT_u)[2(1+a_1)\sin c(\alpha fT_u) - (1+2a_1)\sin c^2(\alpha fT_u/2)]$$

wherein, f represents frequency, $T_u$ represents the width of the original signal, $\alpha$ represents roll-off coefficient, $a_1$ represents first order coefficient.

Said method of the invention does not need information of channel time delay and is easy to realize. The selected roll-off coefficient can be up to 1 so as to suppress the ICI to the largest extent. Additionally, the invention suggests that the generic window functions without ICI can be used in the OFDM system, the common window functions are only special cases. Therefore, the present invention makes the system ability of suppressing ICI stronger by means of finding the best polynomial coefficients under the condition that the roll-off coefficient is 1.

PREFERRED EMBODIMENT OF THE INVENTION

It is believed that through the following description of preferred embodiments in combination with the attached drawings, the above as well as other purposes, features and advantages of the invention will be understood more clearly.

Figure 1:
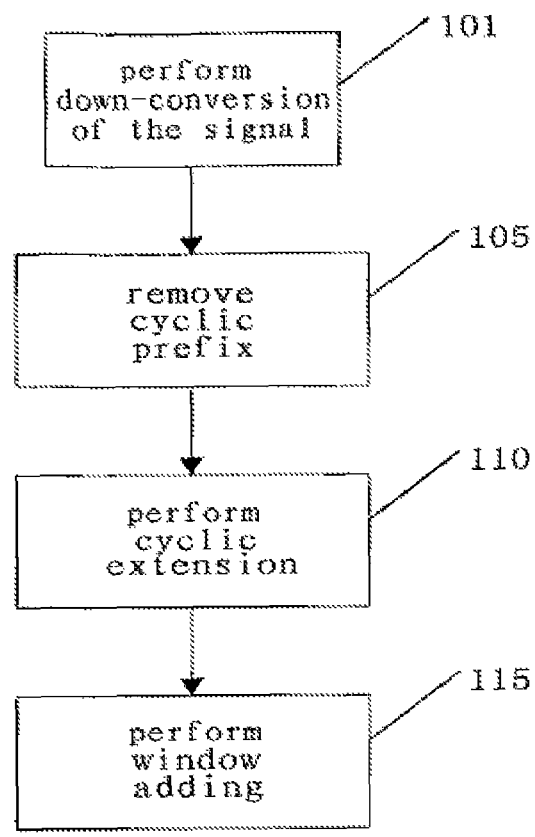
FIG. 1 is a flow chart of a method for suppressing ICI according to an embodiment of the invention.

FIG. 1 is a flow chart of the method for suppressing ICI according to an embodiment of the invention. Firstly, at the receiving end, the signal received is performed down-conversion and is demodulated to be baseband signal; then, the signal is removed cyclic prefix so as to obtain the original OFDM symbol as $$r(t) = e^{j(2\pi \Delta f t + \theta)} \sum_{n=0}^{N-1} a_n e^{j2\pi f_n t}$$

Wherein, $f_n$ represents the frequency of the $n^{th}$ sub-carrier, $a_n$ represents the data symbol transmitted on the $n^{th}$ sub-carrier, $\Delta f$ represents the carrier frequency offset, and $\theta$ represents the phase error.

The signal after being removed the cyclic prefix is performed cyclic extension over again, i.e. copying part or all of the original OFDM symbols to be put before the original OFDM symbols, then the signal after cyclic extension is performed window adding so that the ICI is reduced.

Figure 2:
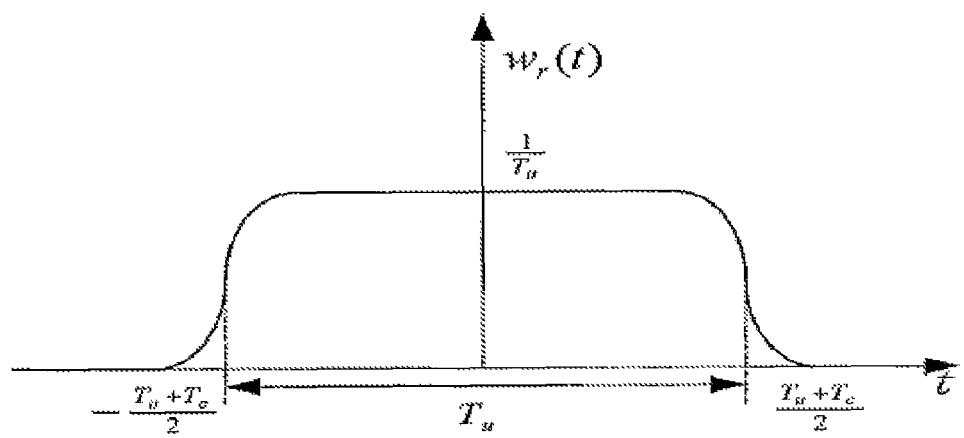
FIG. 2 is a schematic view of a window function.

Provided that the width of the original OFDM symbol is $T_u$, the length of the new cyclic extension is $T_c$, $T_u$ and $T'_c$ satisfy $0 \leq T_c \leq T_u$, then the width of the window function $w_r(t)$ is $T_u + T_c$. The schematic view of the window function is shown as FIG. 2. In order to achieve ICI=0 when there is no frequency offset, the window function $w_r(t)$ must satisfy Nyquist criterion, and its roll-off coefficient satisfies $\alpha = T_c/T_u$.

Thus, the decision variable of performing correlation demodulation for the $m^{th}$ sub-carrier is:

$$\begin{aligned}\tilde{a}_m &= \int_{-(T_u+T_c)/2}^{(T_u+T_c)/2} r(t) w_r(t) e^{-j2\pi f_m t} dt \\ &= a_m e^{j\theta} \int_{-(T_u+T_c)/2}^{(T_u+T_c)/2} w_r(t) e^{j2\pi \Delta f t} dt + \\ &\quad e^{j\theta} \sum_{\substack{n=0 \\ n \neq m}}^{N-1} a_n \int_{-(T_u+T_c)/2}^{(T_u+T_c)/2} w_r(t) e^{j2\pi (f_n - f_m + \Delta f)t} dt \\ &= a_m e^{j\theta} W_r(-\Delta f) + e^{j\theta} \sum_{\substack{n=0 \\ n \neq m}}^{N-1} a_n W_r\left(\frac{m-n}{T} - \Delta f\right)\end{aligned}$$

wherein, $W_r(f)$ represents the Fourier transform of the window function $w_r(t)$. The decision variable is a statistic variable of useful signals, interferences, and noises, which is used for deciding the data symbol detected.

Therefore, the power of the useful signal is $\sigma_m^2 = |a_m|^2 |W_r(\Delta f)|^2$, the power of the ICI is:

$$\sigma_{ICI_m}^2 = \sum_{\substack{n=0 \\ n \neq m}}^{N-1} \sum_{\substack{i=0 \\ i \neq m}}^{N-1} a_n a_i^* W_r\left(\frac{m-n}{T_u} - \Delta f\right) W_r^*\left(\frac{m-i}{T_u} - \Delta f\right)$$

Provided that the data symbol transmitted on the carrier is zero-mean, and satisfies $E[a_n a_i^*]=1$ (when n=i), 0 (when n≠i), then the average ICI power can be represented as:

$$\sigma_{ICI_m}^2 = \sum_{\substack{n=0 \\ n \neq m}}^{N-1} \left|W_r\left(\frac{m-n}{T_u} - \Delta f\right)\right|^2$$

and the corresponding SIR is represented as:

$$SIR = \frac{|W_r(\Delta f)|^2}{\sum_{\substack{n=0 \\ n \neq m}}^{N-1} \left|W_r\left(\frac{m-n}{T_u} - \Delta f\right)\right|^2}$$

From the above formulae, it can be seen that the SIR relates to the position m of the demodulated symbol, the number N of the sub-carriers and the shape of the window function $w_r(t)$.

When performing window adding, the window function can choose rectangle window, raised-cosine Nyquist window function, Better than Nyquist window function, etc.

From the above description, it can be seen that the method for suppressing ICI of this embodiment can suppress the ICI effectively, and the roll-off coefficient can reach to 1.

In order to obtain the best window function, this invention also provides a second order polynomial Nyquist window function, which makes the system ability of resisting ICI stronger by means of finding the best polynomial coefficient under the condition of a given roll-off coefficient.

Provided that $w_r(t)$ is the time-limited window function whose energy is 1, and satisfies Nyquist 1$^{st}$ criterion, i.e. if there is no frequency offset, the ICI will be removed, then the window function $w_r(t)$ can be generally presented as:

$$w_r(t) = \begin{cases} \dfrac{1}{T_u}, & 0 \leq |t| \leq \dfrac{T_u(1-\alpha)}{2} \\ \dfrac{1}{T_u}\left[1 - x\left(-|t|\dfrac{2}{\alpha T_u} + \dfrac{1}{\alpha}\right)\right], & \dfrac{T_u(1-\alpha)}{2} \leq |t| \leq \dfrac{T_u}{2} \\ \dfrac{1}{T_u} x\left(|t|\dfrac{2}{\alpha T_u} - \dfrac{1}{\alpha}\right), & \dfrac{T_u}{2} \leq |t| \leq \dfrac{T_u(1+\alpha)}{2} \\ 0, & |t| \geq \dfrac{T_u(1+\alpha)}{2} \end{cases}$$

Wherein, x(t) is called normalized fundamental function, defined in the interval [0,1].

x(t) is represented by a second order polynomial, i.e. $x(t) = a_0 + a_1 t + a_2 t^2$, then the corresponding $w_r(t)$ is performed Fourier transform, its frequency spectrum is represented as:

$$W_r(f) = \text{sinc}(fT_u)\left[-2(a_1 + 2a_2)\text{sinc}(\alpha fT_u) + 2a_2\text{sinc}^2\left(\frac{\alpha}{2}fT_u\right) + 2(a_0 + a_1 + a_2)\cos(\alpha \pi f T_u) + 1 - 2a_0\right],$$

wherein, $\sin c(f) = \sin(\pi f)/\pi f$.

The discontinuity of the window function in time domain will inevitably result in slow fading of the frequency spectrum waveform, thereby becoming sensitive to the frequency offset. Therefore, in order to ensure the continuity of $w_r(t)$ at $$t = \pm \frac{T_u(1-\alpha)}{2}, \pm \frac{T_u}{2} \text{ and } \pm \frac{T_u(1+\alpha)}{2},$$

it is made that X(0)=0.5 and X(1)=0, obtaining $a_0$=0.5, $a_2$=−0.5−$a_1$, so the frequency spectrum of the window function $w_r(t)$ becomes to be:

$$W_r(f) = \text{sinc}(fT_u)[2(1+a_1)\text{sinc}(\alpha fT_u) - (1+2a_1)\text{sinc}^2(\frac{\alpha}{2}fT_u)],$$

this window function is called second order continuity window (SOCW) function. When the roll-off coefficient α=0, $w_r(t)$ is rectangle window function. When $a_1$=−0.9, the SOCW function and the raised-cosine Nyquist function are substantially the same; when $a_1$=−0.3, the SOCW function and the Better than Nyquist function are substantially the same. This is because that in Taylor series expansion of the normalized fundamental function of these two window functions, the high order terms are less than the low order terms, so the normalized fundamental function can be approximated by a second order polynomial. From the above description, it can be seen that SOCW function is a generic window function without ICI in the OFDM system, and the common window functions are just special cases. If the roll-off coefficient α is given, the best first order coefficient $a_1$ can be found so that the system ability of resisting ICI the strongest. Specifically, when choosing different $a_1$,s by calculating, the best $a_1$ is chosen from the SIR under all the normalized frequency offset ($\Delta fT_u$).

Figure 3:
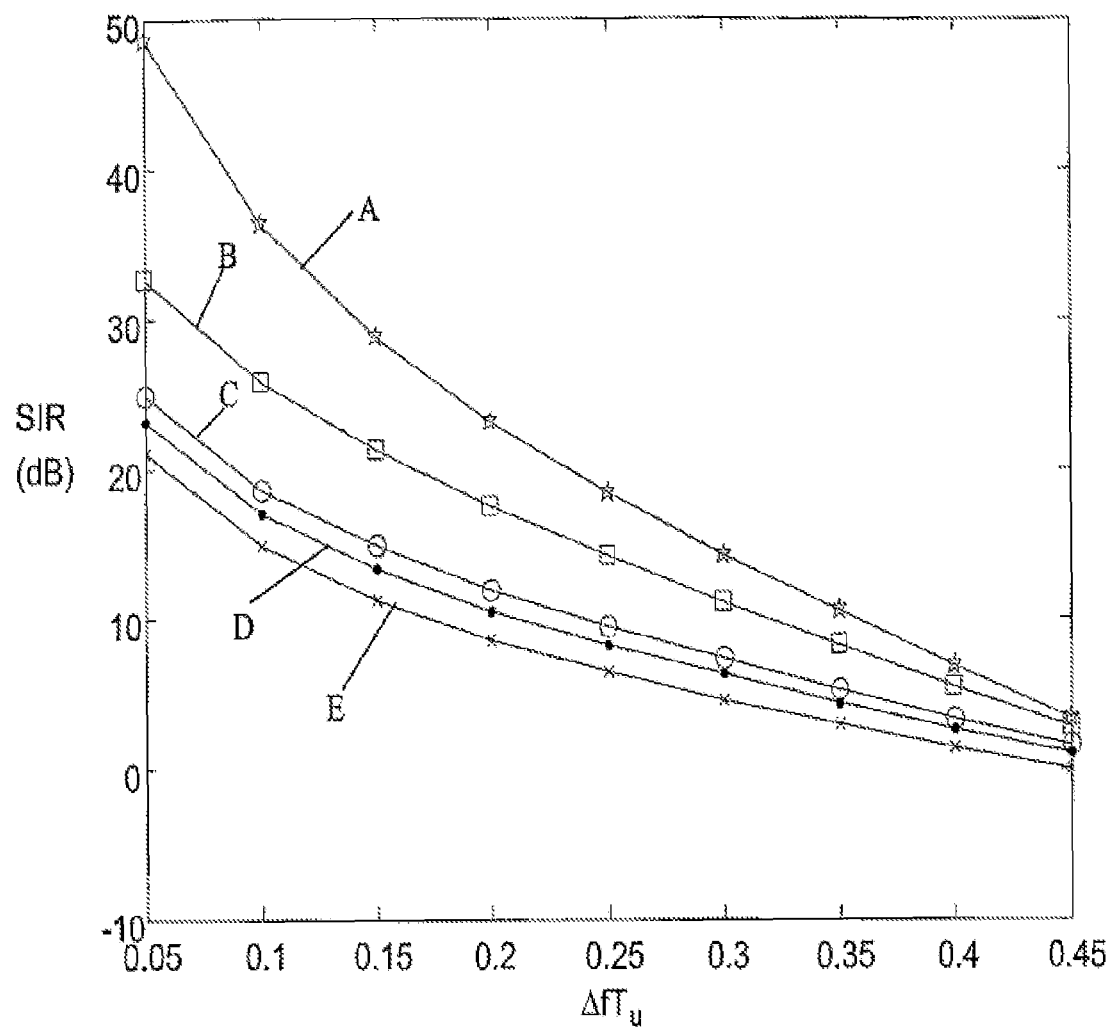
FIG. 3 is a schematic view comparing performance of signal-interference-ratios (SIR) of different window functions.

FIG. 3 is a schematic view comparing the SIR performance of different window functions, showing the SIR characteristic of the output signals of the $32^{th}$ sub-channel in the OFDM system with 64 sub-carriers relative to the normalized frequency offset under different window functions, wherein, A represents the performance plot of a second order continuity window function with the roll-off coefficient α=1, $a_1$=−0.5, B represents the performance plot of a raised-cosine window function with the roll-off coefficient α=1, C represents the performance plot of a second order continuity window function with the roll-off coefficient α=0.3, $a_1$=0.4, D represents the performance plot of a raised-cosine window function with the roll-off coefficient α=0.3, and E represents the performance plot of a rectangle window function. As shown in FIG. 3, when the roll-off coefficient α=1, if the second order continuity window function with $a_1$=−0.5 is chosen, its SIR is much better than that of the rectangle window and cosine window. When the roll-off coefficient α=0.3, if the second order continuity window function with $a_1$=0.4 is chosen, its SIR is also better than that of the rectangle window and cosine window. Additionally, since large roll-off coefficient a can improve performance evidently, it is better to choose α=1 in the practical system.

Figure 4A:
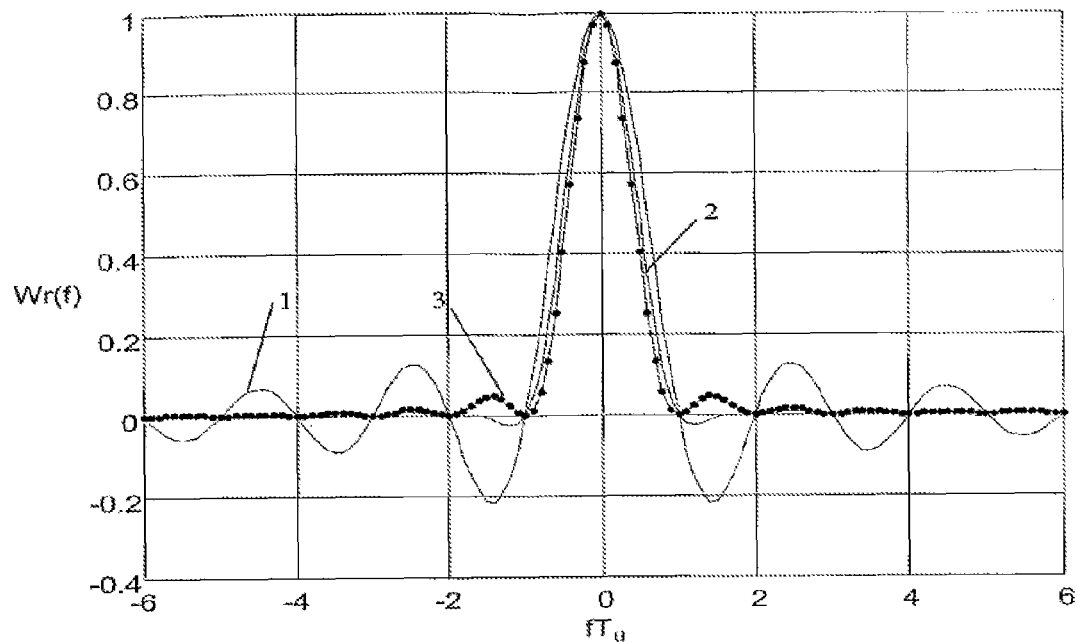
FIG. 4 is a schematic view of frequency spectrums of different window functions: (a) is the view when a=1; (b) is the view when a=0.3.
Figure 4B:
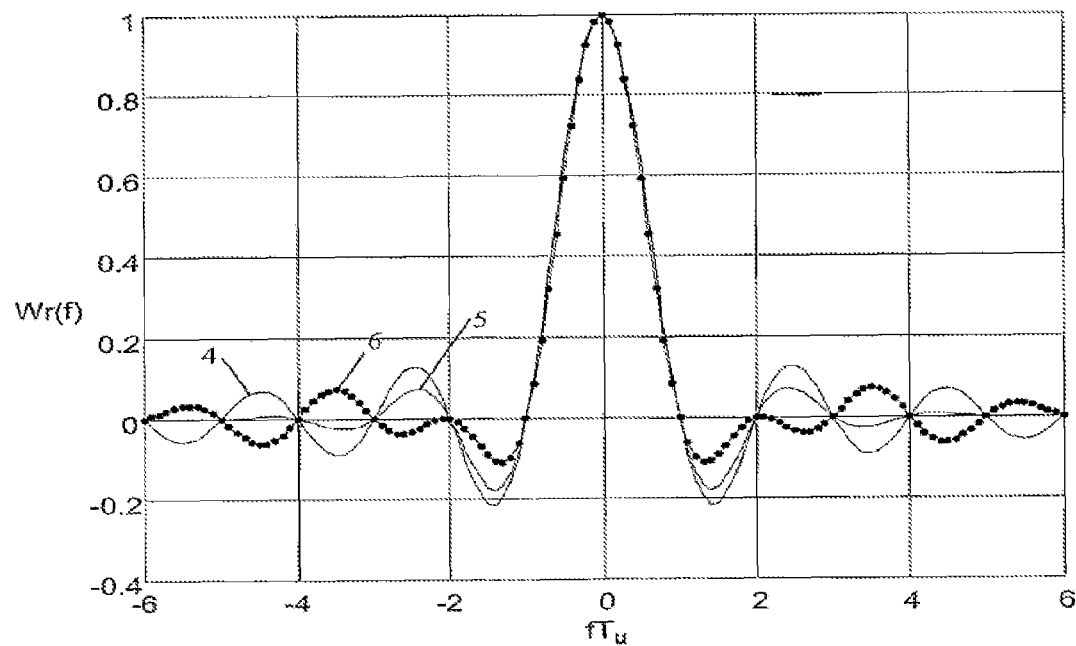

FIG. 4 is a schematic view of frequency spectrums of different window functions, wherein (a) is the frequency spectrum waveform of the window function with α=1, in which plot 1 represents the frequency spectrum waveform of a rectangle window function, plot 2 represents the frequency spectrum waveform of a raised-cosine window function, plot 3 represents the frequency spectrum waveform of a second order continuity window function; (b) is the frequency spectrum waveform of the window function with α=0.3, in which, plot 4 represents the frequency spectrum waveform of a rectangle window function, plot 5 represents the frequency spectrum waveform of a raised-cosine window function, plot 6 represents the frequency spectrum waveform of a second order continuity window function. The sensitivity of the system to the frequency offset is mainly determined by the mainlobe and sidelobe of the frequency spectrum of the window function jointly. In FIG. 4(b), the characteristics of the mainlobes of the three window functions are substantially the same, in such condition, the sensitivity of the window functions to the frequency offset is mainly determined by their sidelobes. The sidelobe of the rectangle window is the biggest, so its sensitivity to the frequency offset is the biggest, the raised-cosine window follows as the second, and the second order continuity window with $a_1$=0.4 is the best. In FIG. 4(a), when $a_1$=−0.5, the sidelobe of the second order continuity window is a little bigger than that of the raised-cosine window, however, it can be known from FIG. 3 that the ability of resisting ICI of the second order continuity window is better than that of the raised-cosine window due to the characteristic of its mainlobe, when $a_1$=−0.5, the mainlobe of the second order continuity window fades faster than the mainlobe of the raised-cosine window does. From the above description, it can be known that by using the second order continuity window function as the window function in the operation of window adding, the best value of the first order coefficient $a_1$ can be chosen more conveniently according to the roll-off coefficient, so that the ICI can be better suppressed.

What I claim is:

1. A method for suppressing inter-carrier interference in an orthogonal frequency division multiplexing (OFDM) mobile communication system, comprising:
   performing down-conversion of a signal received at a receiving end;
   removing a cyclic prefix of the signal to obtain an original signal containing original OFDM symbols at the receiving end;
   reattaching the cyclic prefix to the original signal at the receiving end after the receiving end removing the cyclic prefix of the signal; and
   performing an operation of window adding by a window function at the receiving end, wherein frequency spectrum of the window function in said operation of window adding is:

$$W_r(f) = \text{sinc}(fT_u)[-2(a_1+2a_2)\text{sinc}(\alpha fT_u) + 2a_2\text{sinc}^2(\frac{\alpha}{2}fT_u) + 2(a_0+a_1+a_2)\cos(\alpha\pi fT_u) + 1 - 2a_0]$$

wherein sinc(f)=sin(πf)/πf, f represents frequency, $T_u$ represents width of the original signal, α represents roll-off coefficient, $a_0$ represents zero order coefficient of normalized fundamental function, $a_1$ represents first order coefficient of normalized fundamental function, and $a_2$ represents second order coefficient of normalized fundamental function.

2. The method of claim 1, wherein reattaching the cyclic prefix comprises copying part or all of the original OFDM symbols to be put before the original OFDM symbols.

3. The method of claim 1, wherein $a_0$=0.5, $a_2$=−0.5−$a_1$, the frequency spectrum of said window function is $$W_r(f) = \text{sinc}(fT_u)[2(1+a_1)\text{sinc}(\alpha fT_u) - (1+2a_1)\text{sinc}^2(\frac{\alpha}{2}fT_u)].$$

4. The method of claim 1, wherein said roll-off coefficient is 1.

5. The method of claim 3, wherein said roll-off coefficient is 1.

* * * * *